INVENTOR.
ALAN W. WILKERSON

United States Patent Office 3,219,900
Patented Nov. 23, 1965

1

3,219,900
DIRECT CURRENT MOTOR CONTROL SYSTEMS
Alan W. Wilkerson, Racine, Wis., assignor to The Louis
Allis Co., Milwaukee, Wis., a corporation of Wisconsin
Filed July 7, 1960, Ser. No. 41,371
5 Claims. (Cl. 318—338)

This invention relates in general to direct current motor control systems and, in particular, to direct current motor control systems wherein motor armature voltage and motor field current are individually regulated for controlling motor speed.

One method of controlling direct current motor speed is to individually and sequentially control the field circuit and the armature circuit. For speeds below a base speed the field current is maintained at its rated value and the armature voltage is individually manipulated between zero voltage and rated armature voltage. For speeds above said base speed the armature voltage is maintained at its rated value and the field current is individually manipulated between rated field current to zero field current. A circuit useful for effecting this kind of control is commonly referred to as a cross-over circuit.

Te secure maximum operational efficiency and response from a direct current motor, it is necessary to keep the field constantly excited to rated strength at any speed below base speed and similarly the armature voltage should remain constant at rated value above base speed. Many cross-over circuits only approximate this action with the result that the rated output of the motor is not always available. Further, such circuits generally employ a separate potentiometer for field current control and a separate potentiometer for armature voltage control. In such an arrangement motor efficiency is dependent upon the skill of the person manipulating the separate potentiometers. This problem has been overcome only by providing complicated linkages and gear for operating the potentiometers in gauged relationship. Many cross-over circuits are compensating circuits in that they are designed with the pre-knowledge of the characteristics of the given motor at the given base speed and, therefore, are useful for only a very limited range of base speeds and can be utilized only by motors of similar characteristics.

It is a general object of this invention to provide a new and improved motor speed control system of the cross-over type that is capable of optimum operation over a wide range of motor speeds and for a broad range of motor sizes.

It is another object of this invention to provide a new and improved motor speed control system that has as a characteristic a sharp cross-over between the regulation of motor armature voltage and the regulation of motor field current.

It is a further object of the present invention to provide a new and improved motor speed control system of the cross-over type for which the point of cross-over is adjustable and wherein the system is simple to operate, maintain and adjust.

It is a further object of the invention to provide a new and improved cross-over circuit capable of maintaining selected field current and armature voltage and including but a single variable control for selecting motor speed.

The above and other objects are achieved in accordance with the present invention by providing a control system for the speed control of a direct current motor which utilizes but a single potentiometer to set speed over the entire range of speeds and switching elements responsive to such setting for routing the speed control signal to the appropriate one of the armature voltage and motor field circuits. This routing to either the armature circuit or motor field circuit is dependent on the magnitude of the motor armature voltage. Further, all of the elements, including the potentiometer, are standard electrical components, and the cross-over circuit itself is uncompensated so that it is not limited to use with a specific type, kind or rated motor.

The invention, both as to its structure and manner of use and operation, will be understood by reference to the following specification and drawings forming a part thereof wherein.

Figure 1:
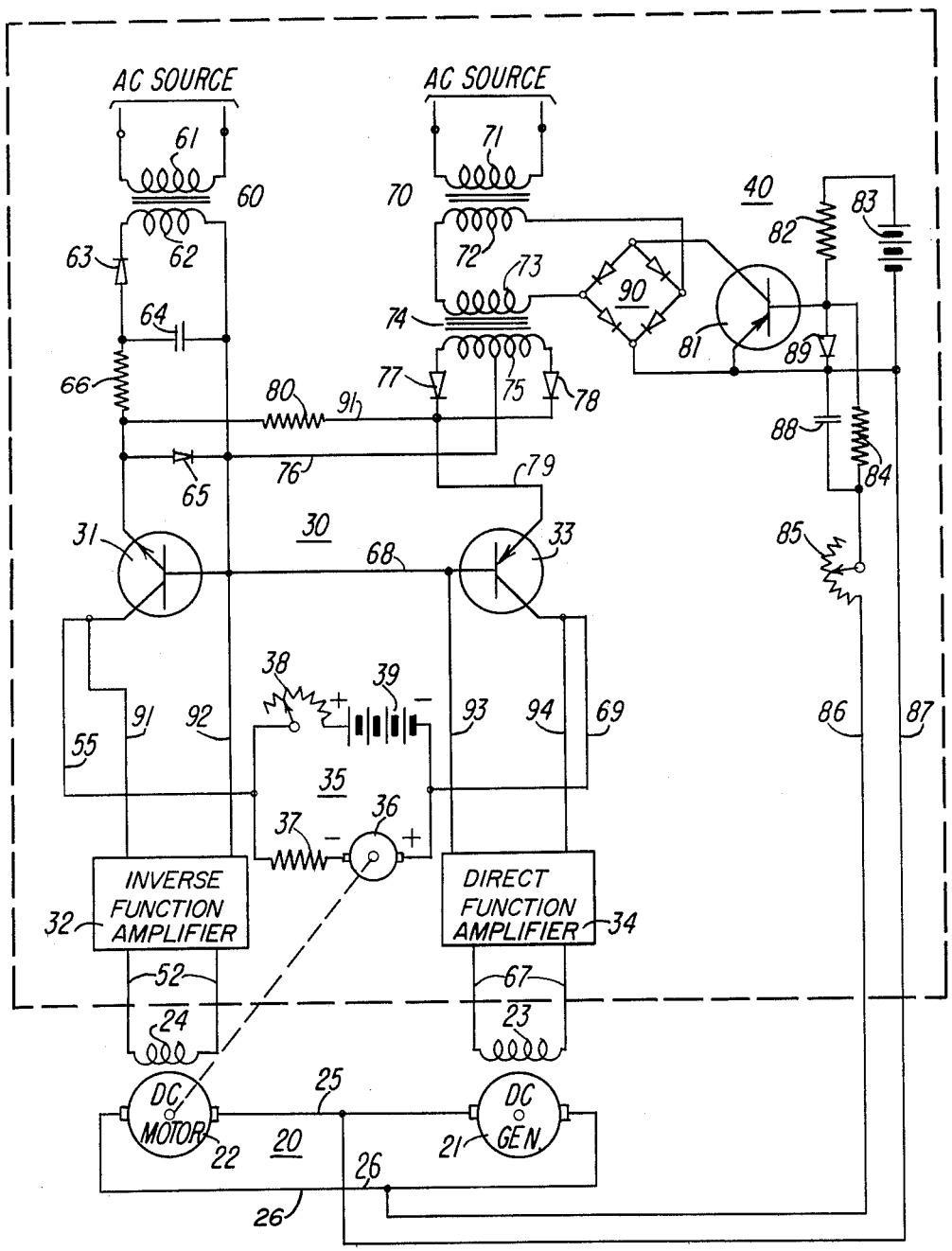
FIG. 1 is a circuit diagram in schematic form of a motor control system embodying the features of one embodiment of the present invention.

Referring now to the drawings, there is shown in FIG. 1 an electrical control system including a motor-generator set 20 and a control circuit 30 therefor. The motor-generator set 20 includes a direct current generator 21 and a direct current motor 22 provided with field windings 23 and 24, respectively. The direct current generator 21 and the direct current motor 22 are connected in a series loop at their armatures by conductors 25 and 26.

The control circuit 30 includes switching transistor 31 and an associated power amplifier 32, a switching transistor 32 and an associated power amplifier 34, a speed controlling circuit 35 for providing a speed controlling signal to the transistor and power amplifier pairs, and a switching circuit 40 for controlling the conductive states of transistors 31 and 33.

The power amplifiers 32 and 34 are connected, respectively, to the motor field winding 24 and the generator field winding 23 for controlling energization thereto in a manner as described in greater detail hereinafter.

The speed controlling circuit 35 includes a direct current source 39 having in series therewith a speed setting potentiometer 38 and in parallel therewith the resistor 37 and a direct current tachometer generator 36, the latter producing a direct current signal proportional to the speed of the D.C. motor 22. The parallel connection of direct current source 39 and tachometer generator 36 functions, in conjunction with the resistors 37 and 38 as a simple bridge circuit. The D.C. source and the generator 36 are poled and connected in aiding relationship in the parallel loop. In operation, the direct current source 39 furnishes a reference signal which can be modified by positioning of the potentiometer 38. A feedback signal derived at the tachometer generator 36 produces a signal corresponding to D.C. motor speed. The difference between the output of the source 39 and generator 36 appears as the output of the bridge. That is, if the output of the tachometer generator 36 is equal to the reference source 39 then there may be no output from the circuit 35. Any unbalance from this condition produces an error signal of a nature to correct the unbalance.

Connected across the armature conductors 25 and 26 is the switching circuit 40, including transistor 81 and associated circuitry, by means of which the transistors 31 and 33 are rendered selectively and alternatively conductive and non-conductive thereby to control motor field energization and generator field energization in the motor generator set 20.

Switching transistor 31 is associated with the field circuit of the direct current motor 22 through amplifier 32 and is of the NPN type. The input circuit to amplifier 32 is connected across the collector base path of transistor 31 through conductors 91 and 92, respectively. The output terminals 52 of amplifier 32 are connected across the field winding 24 of the direct current motor 22. The collector electrode of transistor 31 is also connected to one side of the speed controlling circuit 35 through conductor 55. Direct current for the emitter base path of transistor 31 is derived from an alternating current source (not shown) applied to the primary winding 61 of transformer 60. The secondary winding 62 of transformer 60 is connected in series with a rectifying unidirectional device such as a diode 63 and in parallel with filter capacitor 64. One side of the filter capacitor 64 is connected to the turn-on limit resistor 66 and the other side of resistor 66 is connected to the emitter electrode transistor 31. The base of transistor 31 is connected to the common side of secondary winding 62 of transformer 60 and filter capacitor 64 and the direct current supply circuit is completed therethrough. A unidirectional device 65, which may be a diode, is connected across the emitter-base path of transistor 31 to protect the emitter and base electrodes of transistor 31 against breakdown due to any back-biasing.

Transistor 33 is associated with the armature circuit of D.C. motor 22 through amplifier 34 and field windings 23 of D.C. generator 21 and is of the PNP type. The input to amplifier 34 is connected across the base-collector path of transistor 33 through conductors 93 and 94, respectively. The output terminals 67 of amplifier 34 are connected across the field winding 23 of the direct current generator 21. The base electrode of transistor 33 is connected by conductor 68 to the base electrode of transistor 31. The collector electrode of transistor 33 is connected to one end of speed controlling circuit 35 through conductor 69. In the emitter-base circuit of transistor 33 the direct current supply is interrupted in accordance with the operation of the switching circuit 40 as is considered hereinafter.

As illustrated in FIG. 1, the primary winding 71 of transformer 70 is energized from an alternating current source (not shown). The secondary winding 72 of transformer 70 is connected in a series loop with primary winding 73 of another transformer 74 and diode bridge circuit 90 of switching circuit 40. The secondary winding 72 of transformer 70 and the primary winding 73 of transformer 74 are connected in the switching circuit 40 such that a current flow takes place through the windings thereof only when the transistor 81 is in its conductive state, as will be seen hereinafter.

The secondary winding 75 of the transformer 74 is center-tapped and connected through conductor 76 to the base electrodes of transistors 31 and 33. The output of secondary winding 75 of transformer 74 is rectified by means of the unidirectional conducting devices 77 and 78 which are connected via conductor 79 to the emitter electrode of transistor 33 and via resistor 80 to the emitter electrode of transistor 31.

The transistor 81 of switching circuit 40 is of the PNP type. Connected across the base-emitter electrodes of transistor 81 is the series combination of load resistor 82 and switch biasing source 83, the latter of which is of such a magnitude and polarity as normally to bias transistor 81 non-conductive. The base electrode of transistor 81 is connected through the fixed resistor 84, variable resistor 85 and conductor 86 to armature conductor 26 extending between the direct current generator 21 and the direct current motor 22, and the emitter electrode of transistor 81 is connected through conductor 87 to conductor 25 extending between the armature of the generator 21 and the direct current motor 22. The armature voltage which is delivered via conductors 86 and 87 to the switching circuit 40 is balanced against the bias provided by the switch biasing source 83 through resistor 82. Filter capacitor 88 is connected between the junction of resistor 84 and variable resistor 85 and the emitter electrode of transmitter 81. Diode 89 is connected between the base and emitter electrodes of transistor 81 in order to prevent damage to transistor 81 due to back-bias across the emitter-base electrodes of the transistor.

The collector-emitter current of transistor 81 is derived from the full bridge rectifier circuit 90. As previously stated, the input terminals to the full bridge rectifier circuit 90 is connected in a series loop with the winding 72 of transformer 70 and the winding 73 of transformer 74 and its output terminals are connected across the collector-emitter electrodes of transistor 81.

Figure 3:
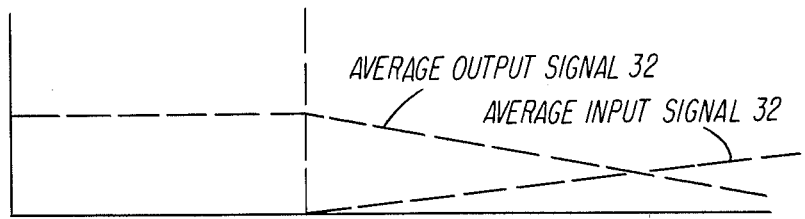
FIG. 3 is a graphic illustration of the average input signal and the average output signal of the motor field amplifier for various motor speeds.
Figure 4:
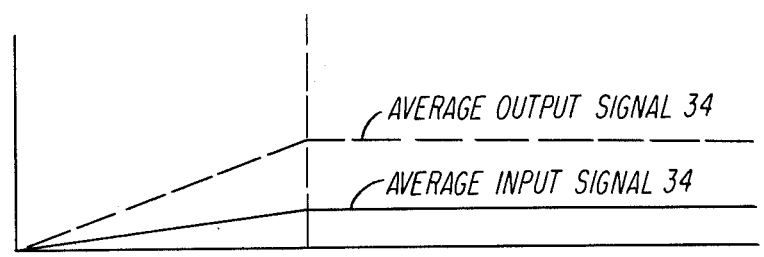
FIG. 4 is a graphic illustration of the average input signal and average output signal of the amplifier associated with the generator supplying the direct current armature voltage for various motor speeds.

Before proceeding with an explanation of the operation of the circuit, consideration must be given to the field amplifiers 32 and 34. Each of these amplifiers are of a different type. Specifically, amplifier 32 is an inverse function amplifier such that an increasing input signal produces a decreasing output signal, and amplifier 34 is a direct function amplifier such that an increasing input signal produces an increasing output signal. FIG. 3 illustrates the action of amplifier 32 as an inverse function amplifier, and such action may be achieved by any conventional structure, such, for example, as a differential amplifier responsive to two signals of opposite polarity, one signal of which may be a fixed bias. FIG. 4 illustrates the action of amplifier 34, which amplifier may be any suitable amplifier.

Considering now the mode of operation for the circuit shown in FIG. 1, and assuming that the motor 22 is at rest and is to be accelerated to a selected speed less than base speed, for example, the output of the direct current tachometer generator 36 is zero. Accordingly, when motor 22 is at rest, the full speed control voltage, as determined by an appropriate setting of potentiometer 38, is provided at the output terminals of the speed controlling circuit 35.

The direct current provided by the alternating current source, which is rectified by unidirectional device 63 and filtered by capacitor 64 and transmitted to the emitter-base path of transistor 31, is of such a polarity as to cause transistor 31 to conduct. Accordingly, control current flows from the speed controlling circuit 35 through conductor 55, the collector-base path of transistor 31, conductor 68, the input to amplifier 34 through conductors 93 and 94, and then via conductor 69 to the opposite side of speed controlling circuit 35. At this time there is no armature voltage, and transistor 81 is biased non-conductive by the switch biasing source 83. Accordingly, there is very little current flow in and substantially no voltage across the primary 73 of transformer 74, and in the absence of current flow in the secondary winding 75, there is no current supply for the emitter-collector path of transistor 33 so that the latter is rendered non-conducting. In this circumstance the control current emanating from the speed controlling circuit 35 is supplied to the input of amplifier 34. In the amplifier 34 the control current produces a corresponding signal at its output terminals 67 extending to the field windings 23 of the direct current generator 21. Accordingly, an armature voltage is developed on the conductors 25 and 26 and extended to the armature of motor 22.

Inasmuch as transistor 31 is conductive, there is no input to the amplifier 32. Specifically, when transistor 31 is in a conducting state the impedance of the collector-base path is substantially less than the input impedance to the amplifier 32 connected in parallel therewith, and hence, current passing through the collector-base path thereof by-passes the input to amplifier 32.

However, at this time, and by virtue of its internal bias, the output of amplifier 32 is maximum as shown in FIG. 3, so that the excitation to the motor field winding 24 is maximum. Additionally, and as illustrated in FIG. 4, the output of the amplifier 34 may be something less than maximum so that excitation to the generator field 23 is less than maximum.

Figure 2:
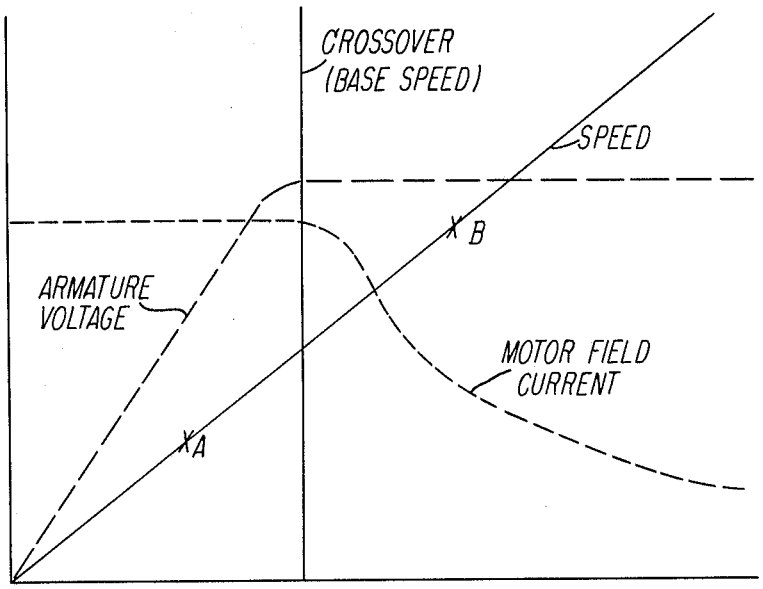
FIG. 2 is a graphic illustration of the relationship of the armature voltage and motor field current to the motor speed.

As the speed of the motor increases towards the selected speed, such as motor speed "A" below base speed, as illustrated in FIG. 2, the output of the tachometer generator 36 increases. This output opposes the direct current source 39 and continues to increase until an equilibrium between opposing signals is achieved. The advantage in providing the tachometer generator 36 is that initially a comparatively large voltage is derived from the speed controlling circuit 35, causing motor 22 to come up to the preselected speed in a shorter time. As the preselected speed, such as motor speed "A," is approached, the output of the tachometer generator 36 increases, diminishing the output of the speed controlling circuit 35 so that the value of the current in the field winding 23 of the generator 21 achieves a predetermined level and the motor speed a corresponding level. Any incipient change in motor speed is reflected by an increase or decrease in the output of the speed controlling circuit 35 and a corresponding increase or decrease in generator field current so as to maintain the speed of the motor relatively constant.

Thereafter should the potentiometer 38 be set to provide a new motor speed "B" above base speed, as shown in FIG. 2, the output of the speed controlling circuit 35 is increased and the value of the current in the field winding 23 of the generator goes to its predetermined maximum level, and the value of the current in the motor field winding 24 decreases to a level somewhat less than maximum. Accordingly, motor speed increases from speed "A" through the cross-over or base speed towards the speed "B."

As the motor generator set reaches rated armature voltage, a speed change is effected in the operation of the control circuit 30. Specifically, the armature voltage across conductors 25 and 26, as extended via conductors 86 and 87 to the switching circuit 40, increases beyond the bias provided by the source 83 so that the transistor 81 is biased conductive at its emitter-base and permits a current flow through the emitter-collector path. Accordingly, alternating current flows in the path, including the winding 72 of transformer 70 and winding 73 of transformer 74.

At the transformer 74 a corresponding alternating current flow is developed in the center tapped secondary winding 75 which current flow is applied through the rectifiers 77 and 78 to the conductors 79 and 91. The supply of current in the conductor 79 renders the transistor 33 conductive in the emitter-collector path and the base-collector path. At the same time, the supply of current in the conductor 91 flows through resistor 80 and diode 65 to back bias transistor 31 non-conductive.

With transistor 31 non-conductive the control current from the network 35 flows through the input conductor 91 and 92 of the amplifier 32 so that the average output signal applied to the motor field winding 24 is decreased in accordance with the pattern shown in FIG. 3. In accordance therewith, less field current is delivered to the field winding 24 resulting in an increase in speed of the D.C. motor 22.

With the transistor 33 conductive at this time, the major portion of the control signal is shunted past the amplifier 34 and hence the field windings 23 of the generator 21, and the armature voltage which appears across the conductors 25 and 26 drops below the preselected voltage level, as determined by the biasing circuit associated with transistor 81 and including the biasing source 83.

When the armature voltage drops below the preselected level, transistor 81 is rendered non-conductive, causing the direct current supply to be removed from conductors 79 and 91, thereby rendering transistor 31 conductive. Thereupon the armature voltage is reinstated to its maximum predetermined level by virtue of the large control signal from network 35 so that transistor 81 is again rendered conductive and the cycle repeats.

As can be seen, a vibratory type of switching occurs. Transistor 81 is selected such that the slightest increase in armature voltage over the switch biasing potential of source 83 immediately and rapidly renders transistor 81 conductive. The average current delivered to the field windings 23 of D.C. generator 21 in this circumstance is sufficient to only cause the armature output of voltage to be at the preselected level. Therefore, the greater the magnitude of the biasing signal, as determined by the potentiometer 38, the greater the "ON" time of transistor 33 as compared to the "ON" time of transistor 31, and the greater the average signal that will be delivered to the input of amplifier 32, and hence the lesser the average current that will be delivered to the field winding 24 of motor 22.

As the motor speed approaches the speed "B" the signal provided by the tachometer generator 36 increases in magnitude and bucks that signal provided from the potentiometer 38 and source 39 until equilibrium is achieved between motor speed and control signal from network 35. Incipient changes are recognized as deviations from that equilibrium condition and are utilized by the system to re-establish that equilibrium condition.

By way of review, transistor 31 is initially in the conducting state and transistor 33 is initially in the non-conducting state. When the speed control signal as provided by the circuit 35 is such as to correspond to a speed below the base speed, then transistor 31 remains in the conducting stage continuously and transistor 33 remains in the non-conducting stage continuously so that there is no input signal delivered to amplifier 32. An input signal proportional to the signal across the speed controlling circuit 35 is thus delivered to the input terminals of amplifier 34 and consequently to the field windings of the D.C. generator 21. The voltage generated by D.C. generator 21, and which appears across the conductors 25 and 26, never exceeds the predetermined biasing voltage as determined by the switch biasing source 83 and hence transistor 81 remains in the non-conducting state.

However, when the potentiometer 38 is adjusted to provide a signal which corresponds to a speed above the selected base speed, the transistors 31 and 33 alternate between conducting and non-conducting states. The average input signal delivered to amplifier 34 is such as to maintain the current in the field winding 23 of generator 21 and the armature voltage at its preselected maximum value. The average input signal delivered to amplifier 32 is proportional to the output of the speed controlling circuit 35. However, at this time the transistors 31 and 33 are being switched "on" and "off," and the greater the voltage at the output of the speed controlling circuit 35, the longer the time that transistor 31 is in its non-conducting state and the relative longer period of time that transistor 33 is in its conducting stage. The average current delivered to the windings 23 of D.C. generator 21 will be relatively constant and the average current delivered to the winding 24 of the D.C. motor 22 will be directly proportional to the setting of the potentiometer 38.

Deacceleration is characterized by the return of the motor field current to rated value followed by a decrease in the armature voltage. In all respects it is the reverse of the operation during acceleration making further explanation unnecessary.

The control system described herein is a speed control system having incorporated therein a tachometer generator for providing feedback control. It is understood that this arrangement is merely exemplary of the invention and that the principle of the invention can be applied with equal ease to other kinds of regulators, including tension and position regulators. Obviously, the motor generator arrangement is illustrative of but one of the means by which a variable armature voltage can be supplied to a motor.

While the embodiment described herein is at present considered to be preferred, it is understood that various modifications and improvements may be made therein, and it is intended that the appended claims cover all

What is claimed is:

1. An improved drive system for a direct current motor having a field circuit and an armature circuit, comprising a speed control circuit providing a speed control signal corresponding to the difference between a preselected signal and a signal proportional to the speed of the direct current motor, a first amplifier for controlling the magnitude of the current in said field circuit, said first amplifier providing field current that varies inversely with the magnitude of control signal applied thereto, a first transistor connected across said first amplifier at the collector-base electrodes thereof, said first transistor being selectively conductive and non-conductive at the collector-base electrodes and during non-conduction presenting an impedance greater than that of said first amplifier, a second amplifier for controlling the magnitude of the voltage in said armature circuit, said second amplifier providing an armature voltage that varies directly with the magnitude of the control signal applied thereto, a second transistor being connected across said second amplifier at the collector-base electrodes thereof, said second transistor being selectively conductive and non-conductive at the base electrodes and during non-conduction presenting an impedance greater than that of said second amplifier, said speed control circuit and said combination of first amplifier and first transistor and said combination of second amplifier and second transistor being connected in a series loop for applying said speed control signal selectively to said first and second amplifier in accordance with the conduction and non-conduction state of said first and second transistors, means including a third transistor operative into a first condition responsive to an armature circuit voltage below a predetermined voltage for rendering said first transistor conductive and said second transistor non-conductive in the collector-base path and operative into a second condition responsive to an armature circuit voltage above a predetermined voltage for rendering said first transistor non-conductive and said second transistor conductive in the collector-base path, whereby below said predetermined armature voltage said armature circuit is energized to increase said armature voltage and motor speed and above said predetermined armature voltage said field circuit is energized to decrease the field current and increase motor speed.

2. An improved drive system for a direct current motor having a field circuit and an armature circuit comprising:

a speed control circuit proving a speed control signal corresponding to the difference between a preselected signal and a signal proportional to the speed of the direct current motor;

a first switching element having a first and a second switching state controlled from said control circuit for selectively applying and by-passing said control signal from said field circuit;

a second switching element having a first and a second switching state controlled from said control circuit for selectively applying and bypassing said control signal from said armature circuit;

means including a third switching element operative into a first switching state when the voltage across said armature circuit is below a predetermined armature voltage and operative into a second switching state when the voltage across said armature circuit is above said predetermined armature voltage;

circuit means responsive to said third switching element being in said first state for operating said first element into said first switching state to provide a continuous, variable signal proportional to said speed control signal to said armature circuit when the voltage across said armature circuit is below said predetermined armature voltage to vary said armature voltage and to maintain said field current constant and responsive to said third switching element being alternately in the first and second states to provide intermittent variable signals proportional to said speed control signals to said armature circuit and field circuit through said first and second switching elements when said voltage across said armature circuit attains said predetermined armature voltage to maintain said armature voltage at the predetermined level and vary said field current, whereby a single motor speed control signal may control the speed of a direct current motor by controlling the field circuit and the armature circuit of said direct current motor.

3. An improved drive system for a direct current motor having a field circuit and an armature circuit comprising:

a speed control circuit providing a speed control signal corresponding to the difference between a preselected signal and a signal proportional to the speed of the direct current motor;

a first amplifier for controlling the magnitude of the current in said field circuit, said first amplifier providing field current which varies inversely with the magnitude of the control signal applied thereto;

a first switching element having a first switching state and a second switching state respectively for applying said speed control signal to said first amplifier and for bypassing said speed control signal about said first amplifier;

a second amplifier for controlling the magnitude of the voltage in said armature circuit, said second amplifier providing an armature voltage that varies directly with the magnitude of the control signal applied thereto;

a second switching element having a first switching state and a second switching state respectively for bypassing said speed control signal about said second amplifier and for applying said speed control signal to said second amplifier;

means including a third switching element operative into a first switching state when the voltage across said armature circuit is below a predetermined voltage and operative into a second switching state when the voltage across said armature circuit is above said predetermined armature voltage;

circuit means responsive to said third switching element being in said first state for operating said first elements into said first switching state and said record switching element into said second switching state to provide a continuous variable signal proportional to said speed control signal to said second amplifier when said voltage across said armature circuit is below said predetermined voltage to vary said armature voltage and to maintain said field current constant and responsive to said third switching element being alternately in the first and second states to provide intermittent variable signals proportional to said speed control signal to said first and second amplifiers through said first and second switching elements when said voltage across said armature circuit attains said predetermined voltage to maintain said predetermined armature voltage and vary said field current, whereby a single motor speed control signal may control the speed of a direct current motor by controlling the field circuit and the armature circuit of said direct current motor.

4. The drive system set forth in claim 3 wherein said speed control circuit and the combination of said first amplifier and first switching element and the combination of said second amplifier and second switching element are connected in a series loop.

5. The drive system as set forth in claim 4 wherein said combination of, said first amplifier and first switching element and the combination of said second amplifier and second switching element is each a parallel circuit combination.

References Cited by the Examiner
UNITED STATES PATENTS

| | | | |
|---|---|---|---|
| 2,855,554 | 10/1958 | Conger | 318—317 X |
| 3,022,453 | 2/1962 | Jones | 318—146 X |
| 3,026,464 | 3/1962 | Greening et al. | 318—338 X |

ORIS L. RADER, *Primary Examiner.*

MILTON O. HIRSHFIELD, *Examiner.*